(12) United States Patent
Laconto et al.

(10) Patent No.: US 7,306,748 B2
(45) Date of Patent: Dec. 11, 2007

(54) METHODS FOR MACHINING CERAMICS

(75) Inventors: Ronald W. Laconto, Leicester, MA (US); Douglas E. Ward, Santa Ana, CA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 494 days.

(21) Appl. No.: 10/423,283

(22) Filed: Apr. 25, 2003

(65) Prior Publication Data

US 2004/0226917 A1   Nov. 18, 2004

(51) Int. Cl.
- *B44C 1/22* (2006.01)
- *C03C 15/00* (2006.01)
- *C03C 25/68* (2006.01)
- *C23F 1/00* (2006.01)

(52) U.S. Cl. .................................................. 216/89

(58) Field of Classification Search ............. 216/88, 216/89, 90, 91, 92; 438/691, 692, 693; 451/41
See application file for complete search history.

(56) References Cited

U.S. PATENT DOCUMENTS

| 5,366,542 | A | 11/1994 | Yamada et al. | |
|---|---|---|---|---|
| 5,437,887 | A | 8/1995 | Yarkosky et al. | |
| 5,549,978 | A * | 8/1996 | Iwasaki et al. | 428/811.2 |
| 5,999,368 | A * | 12/1999 | Katayama | 360/235.2 |
| 6,439,986 | B1 | 8/2002 | Myoung et al. | |
| 6,497,611 | B2 | 12/2002 | Sakurada et al. | |
| 6,500,049 | B2 | 12/2002 | Orii et al. | |
| 6,604,987 | B1 * | 8/2003 | Sun | 451/41 |
| 6,755,721 | B2 * | 6/2004 | Ward et al. | 451/28 |
| 2001/0009840 | A1 * | 7/2001 | Orii et al. | 451/41 |
| 2002/0031979 | A1 * | 3/2002 | Sakurada et al. | 451/5 |

FOREIGN PATENT DOCUMENTS

| DE | 101 47 897 C | 1/2003 |
|---|---|---|
| EP | 0 280 438 A2 | 8/1988 |
| KR | 2000-0024453 | 5/2000 |
| WO | WO 01/12740 A | 2/2001 |
| WO | WO 01/012740 A1 | 2/2001 |
| WO | WO 01/36554 A1 | 5/2001 |
| WO | WO 01/74959 A2 | 10/2001 |
| WO | WO 03/031527 A1 | 4/2003 |

OTHER PUBLICATIONS

Honglin Zhu, "Chemical Mechanical Polishing (CMP) of Sapphire," Abstract of Dissertation, 1 p.
Rami Schalair, et al., "An Alumina-Ceria CMP Slurry for Glass," Saint-Gobain Ceramics & Plastics product brochure, 12 pp.
All Organic Corrosion Inhibitor for Ferrous Metals Application Information, Belcor 575, 9 pp.
L. J. Schowalter, et al., "Preparation and characterization of Single-Crystal Aluminum Nitride Substrates", Mater. Res. Soc. Symp. Proc. 595, W6.7.6, 2000, Abstract.

* cited by examiner

*Primary Examiner*—Roberts Culbert
(74) *Attorney, Agent, or Firm*—Larson Newman Abel Polansky & White, LLP; Joseph P. Sullivan (57) ABSTRACT

A method for machining a ceramic substrate containing Al, including providing a slurry between a substrate and a machine tool, the slurry containing alumina abrasive and an additive including a phosphorus compound, and moving the substrate relative to the machine tool.

19 Claims, 5 Drawing Sheets

METHODS FOR MACHINING CERAMICS

BACKGROUND

1. Field of the Invention

The present invention is generally related to machining ceramic substrates, and in particular, polishing substrates.

2. Description of the Related Art

Machining, and in particular, polishing of substrates is widely used for formation of various devices, including microelectronic devices. For example, during wafer processing to form integrated circuit devices, wafers are subjected to chemical-mechanical polishing (CMP) to remove layers and planarize the wafer. In the area of magneto-resistive (MR) head manufacture, aluminum alloy substrates are polished to form jigs, and air-bearing surfaces of read/write heads for hard disk drives (HDD's) are polished and planarized.

In the context of machining, abrasive slurries are commonly used in lapping operations as well as polishing operations. Lapping generally denotes processes utilizing fairly large abrasive particles (e.g., 2-10 microns), and associated high material removal rates. Polishing, on the other hand, generally takes advantage of smaller abrasive particles, yields fairly low material removal rates, and superior surface finishes. Typically, one of the goals of a polishing operation is to provide a planar surface having relatively low surface roughness, free of defects such as scratches, "orange peel," and "pull-out" of material along the exposed surface of the substrate. In addition, with respect to substrates having multiple phases of materials that are being polished (e.g., a hard ceramic portion and a soft conductive layer, such as in the case of HDD recording heads), it is also important to engineer a polishing operation which has a consistent material removal rate across different materials, so as to prevent selective polishing of soft materials of the substrate.

In an effort to increase polishing rates, reduce material removal selectivity, and reduce defects, polishing technology has evolved to combine mechanical removal (i.e., abrasion) of substrate material, along with a chemical reactive process. Such processes have been described in the industry as chemical-mechanical polishing, CMP, as noted above. The development of CMP processes and slurries containing such chemical and mechanical components have been intensely studied in certain areas such as semiconductor processing. However, a need continues to exist in the art for improved machining operations and slurries for carrying out such operations, and in particular, slurries and operations intended to polish aluminum-containing ceramics, such as alumina, alumina composites, non-oxide aluminum containing ceramics and the like.

SUMMARY

According to a first aspect of the present invention, a method for machining a ceramic substrate containing aluminum is provided. First, a slurry is provided between the substrate and a machining tool, and the substrate is moved relative to the machining tool. The slurry comprises an abrasive and an additive comprising a phosphorus compound. The abrasive may contain an alumina abrasive.

According to another aspect of the present invention, a method for machining a ceramic substrate containing aluminum is provided, in which a slurry is provided containing an abrasive and an additive comprising a phosphorus compound, contacting the substrate with a machining tool such that the slurry is provided between the machining tool and the substrate, and moving at least one of the substrates and the machining tool such that the substrate is moved relative to the machining tool at a velocity not less than about 2.0 meters/second.

According to yet another aspect of the present invention a method for polishing a ceramic substrate is provided in which a slurry is provided between the ceramic substrate and a machining tool, the slurry containing an abrasive and a material removal additive, and polishing the substrate at a ratio of $MRR_{add}/MRR_{con}$ is not less than 1.2. In this context, $MRR_{add}$ represents the material removal rate of polishing the substrate with the above-mentioned slurry containing the abrasive and the material removal additive, while $MRR_{con}$ represents the material removal rate under identical process conditions with a control slurry which is free of the material removal additive (i.e., a slurry in which the material removal additive is not added). The control slurry is generally otherwise the same as the above-mentioned slurry containing an abrasive and a material removal additive.

Another embodiment calls for a polishing slurry, including: a liquid medium; an abrasive dispersed in the liquid medium; and an additive comprising a phosphorus compound.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

According to one aspect of the invention, a method for machining a ceramic substrate is provided. The ceramic substrate contains the element aluminum, and includes aluminum oxide and non-oxide ceramic materials. According to the method, a slurry is provided between the substrate and a machine tool, and the substrate is moved relative to the machine tool to carry out the machining operation. According to a particular feature of this embodiment, the slurry contains an alumina abrasive and an additive containing a phosphorus compound.

The slurry generally falls into the category of chemical-mechanical polishing (CMP) slurries. Effectively, the alumina abrasive provides the mechanical component, and the phosphorus compound is a chemically active component to aid in the machining operation, such as polishing.

Turning to the alumina abrasive, the median particle size may be within a range of about 0.05 microns to about 1.5 microns. Typically, the median particle size is within a slightly narrower range, such as within a range of about 0.1 to about 1.0 microns, such as 0.10 to about 0.50 microns. Specification of the median particle size to be under 1.0 micron generally denotes a polishing process in which a fine surface finish is provided by carrying out the machining operation at fairly low material removal rates. At median particle sizes above about 1 micron, such as on the order of 2 to 5 microns, typically the machining operation is characterized as a lapping operation.

As stated above, the ceramic substrate generally contains the element aluminum. The particular composition of the substrate may vary, such as aluminum oxide (alumina) or aluminum oxide-containing compositions. Such compositions generally include at least one other component, and examples of such components include yttria aluminate, aluminosilicate, alumina-titanium carbide (AlTiC), aluminum oxynitride (AlON), and aluminum-containing garnets and spinels. The substrate may be polycrystalline or monocrystalline. In the case of alumina, the single crystalline material is known as sapphire. In this regard, the sapphire may be machined (e.g., polished) along one of the common crystallographic planes of the material, such as the c-plane, the a-plane, or the r-plane. In addition to aluminum oxide based materials, the ceramic substrate may be formed of an aluminum non-oxide material, such as aluminum nitride.

According to an embodiment of the present invention, the phosphorus compound contains oxygen, wherein oxygen is bonded to the phosphorus element. This class of materials is known as oxophosphorus materials. Preferably, the oxophosphorus compound contains phosphorus in valency state of one, three or five, and in particular embodiments, effective machining has been carried out by utilizing an oxophosphorus compound in which the phosphorus is in a valency state of five.

In certain embodiments, the phosphorus may be bonded to carbon in addition to oxygen, which generally form organic phosphorus compounds known as phosphonates. Other groups of phosphorus compounds include phosphates, pyrophosphates, hypophosphates, subphosphates, phosphites, pyrophosphites, hypophosphites and phosphonium compounds. Particular species of the phosphorus compounds include potassium phosphate, sodium hexametaphosphate, hydroxy phosphono acetic acid (Belcor 575) and aminotri-(methylenephosphonicacid) (Mayoquest 1320).

Typically, the slurry containing the abrasive component and the additive containing the phosphorus compound is aqueous, that is, water-based. The slurry may have a pH greater than about 8, such as greater than about 8.5. The pH may range up to a value of about eleven. However, a suitable range may be within a slightly narrow range such as about 9 to about 9.5.

Figure 1:
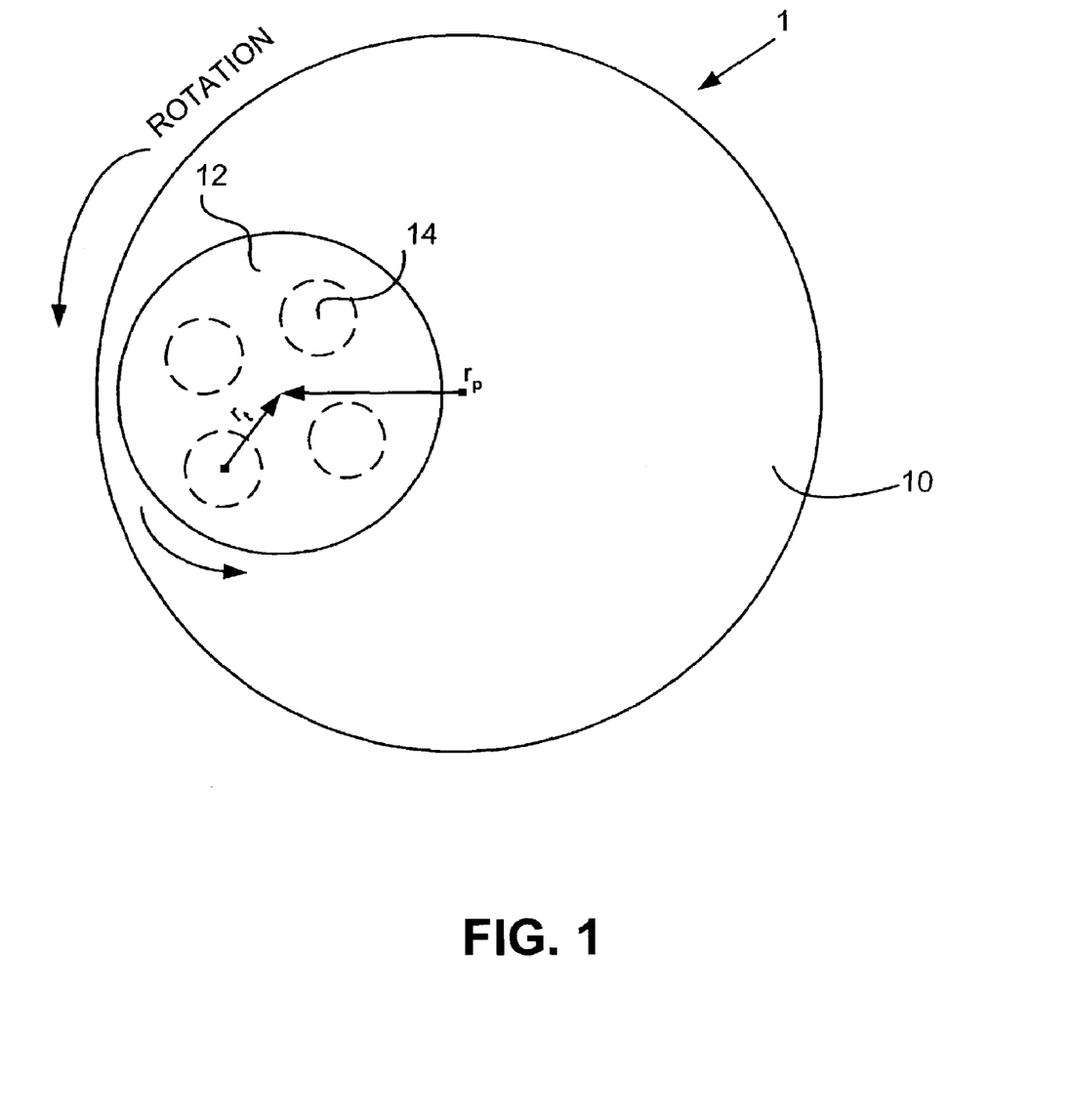
FIG. 1 illustrates a schematic view of a polishing structure used in accordance with an embodiment of the present invention.

FIG. 1 illustrates a schematic of the basic structure of a polishing apparatus according to an embodiment of the present invention. The apparatus 1 includes a machine tool, which in this case is formed by a polishing pad 10 and a platen, which supports the polishing pad. The platen and polishing pad are of essentially the same diameter. The platen is rotatable about a central axis, along a direction of rotation as illustrated by the arrow. A template 12 has a plurality of circular indentations which respectively receive substrates 14, the substrates 14 being sandwiched between the polishing pad 10 and the template 12. The template 12, carrying the substrates 14, rotates about its central axis. $r_p$ represents the radius from the center of rotation of the polishing pad to the center of the template 12, whereas $r_t$ represents the radius from an individual substrate to the center of rotation of the template. The configuration of apparatus 1 is a commonly employed configuration for polishing operations, although different configurations may be utilized. In this particular case, the net velocity or speed of the substrates relative to the polishing pad is calculated according to the following equation. Namely, the general formula for velocity of the rotating platen and template is:

$$(2 \cdot \pi \cdot r (\text{inches}) \times \text{rpm})/60 \times 39.37 = V(\text{meters/second}),$$
which gives:

$$((2 \cdot \pi \cdot r_p \cdot \text{rpm})/60 \times 39.37) + ((2 \cdot \pi \cdot r_c \cdot \text{rpm})/60 \times 39.37) = V$$

Calculations were carried out to determine the rotational velocity of each of the platen/polishing pad assembly and the template 12. To approximate the linear velocity (net) of the substrate 14 relative to the platen assembly, one half of the velocity of the template 14 was added to the velocity of the platen assembly. This resultant net velocity actually represents an average of the velocity of the substrates experienced relative to the platen during a polishing cycle. In this regard, it is noted that the actual velocity of the substrates varies according to the rotational position of the substrates. For example, at nine o'clock position, a substrate will experience an instantaneous velocity of zero, assuming that the rotational speed of the platen is the same as the rotational speed of the template. On the other hand, at the three o'clock position, the substrate will experience a maximum velocity. According to an embodiment of the present invention, the velocity of the substrate relative to the platen assembly (net) is not less than about 2.0 m/s. Other embodiments were operated at higher velocities, such as not less than about 2.3 m/s, not less than about 2.5 m/s, and not less than about 3.0 m/s. The actual relative velocity of the substrate is chosen so as to maximize the beneficial effects of the addition of the phosphorus containing compound additive in the slurry. In this regard, it was found that at certain minimum velocities, the chemical and mechanical polishing mechanisms acting on the substrate from the slurry containing a phosphorus-additive demonstrated superior results over slurries without such an additive.

Turning back to the slurry, a phosphorus additive may be present in the slurry at a concentration of about 0.05 to about 5 wt %, such as about 0.10 to about 3.0 wt %. Particular embodiments utilize a concentration within a slightly narrower range such as on the order of 0.10 to about 1.0 wt %. In this regard, the foregoing percentages relate to the phosphorus-based compound relative to the total wt % of the slurry. In this regard, it is typical that such a compound is provided in diluted form, such as in a 10% solution. The foregoing weight percent ranges relate to the phosphorus compound(s) and not the total weight percent of the additive, typically in diluted form. Further, the loading of solids in the slurry may vary depending on the particular application and apparatus undergoing machining operations. For example, the solids may be loaded within a range of about 2 to about 30 wt %, such as 2 to about 20 wt %. Certain embodiments are loaded with solids within a narrower range such as about 2 to about 10 wt %.

According to embodiments of the present invention, the material removal rate (MRR) was found to improve significantly over slurries having no phosphorus-based additive. According to one embodiment, a ratio $MRR_{add}/MRR_{con}$ is not less than about 1.2. In this regard $MRR_{add}$ is the material removal rate of polishing the substrate with a slurry comprising an abrasive and the additive containing the phosphorus compound, whereas $MRR_{con}$ is the material removal rate under identical process conditions with a control slurry, the control slurry being essentially identical to the above-mentioned slurry but being free of the additive containing the phosphorus compound. Particular embodiments illustrated even superior material removal rate ratios, such as not less than about 1.5, or even not less than about 1.8. Certain examples illustrated an MRR ratio greater than about two, representing twice the removal rate over a slurry containing only an alumina abrasive and no phosphorus compound additive.

According to another embodiment of the present invention a method for machining an aluminum-containing substrate is provided, in which a slurry containing an abrasive and an additive is provided between the substrate and a machine tool, and at least of one the substrate in the machine tool is moved such that the substrate is moved relative to the machine tool at a velocity not less than about 2.0 m/s. As above, the additive contains a phosphorus compound. The substrate may be stationary and the machine tool moved, or the machine may remain fixed and the substrate moved, or both the machine tool and the substrate may be moved. Typically, movement is rotational, as described above in connection with FIG. 1.

EXAMPLE 1

Turning to specific examples, a plurality of slurries according to embodiments of the present invention, and control slurries were prepared and tested utilizing the polishing apparatus 1 illustrated in FIG. 1. The testing was carried out on a single-side polishing apparatus as illustrated, equipped with a Suba H2 polishing pad from Rodel. Polishing pressure was 9 psi.

First, a slurry was provided having 3 wt % of a phosphate additive solution provided in an aqueous solution, loaded with 6 wt % alumina particles. In this regard, the 3 wt % additive solution was a 10% phosphate solution, such that the phosphate additive was loaded at 0.3 wt % in the slurry. The particular phosphate additive was hydroxyl phosphonic acid, commercially available as Belcor 575. This material is also referred to as HPA. The particular alumina particulate used is a commercially available powder from Saint Gobain Corporation having a designation 9240.2mic The powder, forming the abrasive component, had a median particle size of about 0.2 microns, and was loaded in the slurry at a 6 wt % solids loading content. The slurry had a pH of approximately 10.2.

A second slurry was prepared identical to the first, but without a phosphate additive. The slurries were used to polish an alumina substrate, namely a sapphire substrate, along the c-plane. Several samples were polished at varying velocities, calculated as described above in connection with FIG. 1. Data was taken at velocities of 1.18, 2.30, 3.39, and 4.44 m/s. The results are shown in Table 1 below and in FIG. 2.

TABLE 1

| m/sec | MRR, No Phosphates | MRR, 3 wt % Phosphate additive sol'n |
|---|---|---|
| V = 4.44 | 8.7 | 16.3 |
| V = 3.39 | 6.0 | 10.3 |
| V = 2.30 | 6.3 | 6.3 |
| V = 1.18 | 4.3 | 4.7 |

Figure 2:
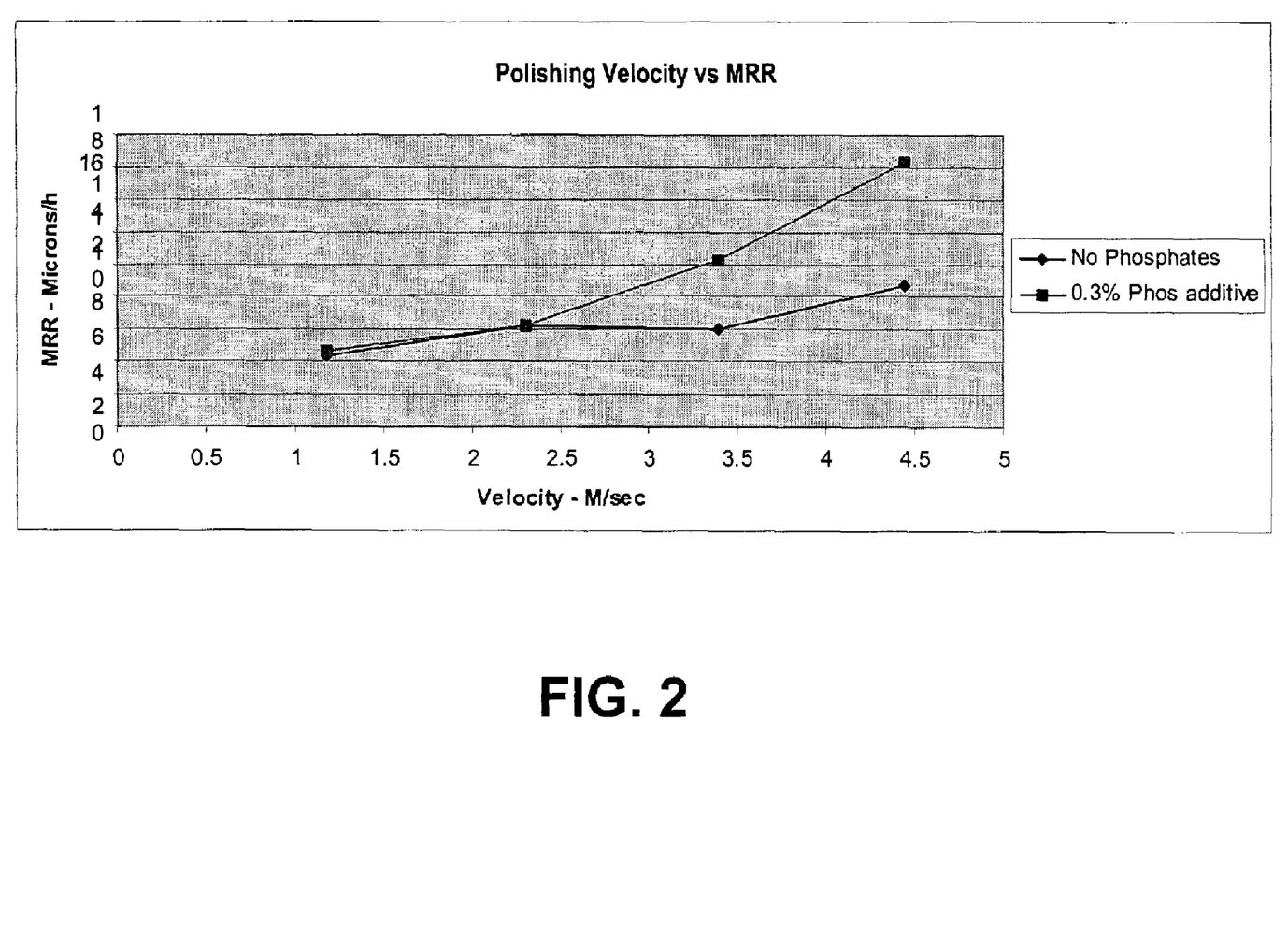
FIG. 2 illustrates the effective of polishing velocity on material removal rate according to various examples.

FIG. 2 and Table 1 summarize data of polishing velocity (net) of the substrate relative to the platen assembly, versus the material removal rate (MRR). As demonstrated by the data, in this particular embodiment, it was shown that at a net substrate velocity greater than 3.4, the sample containing the phosphate-based additive demonstrated clearly superior material removal characteristics.

EXAMPLE 2

Figure 3:
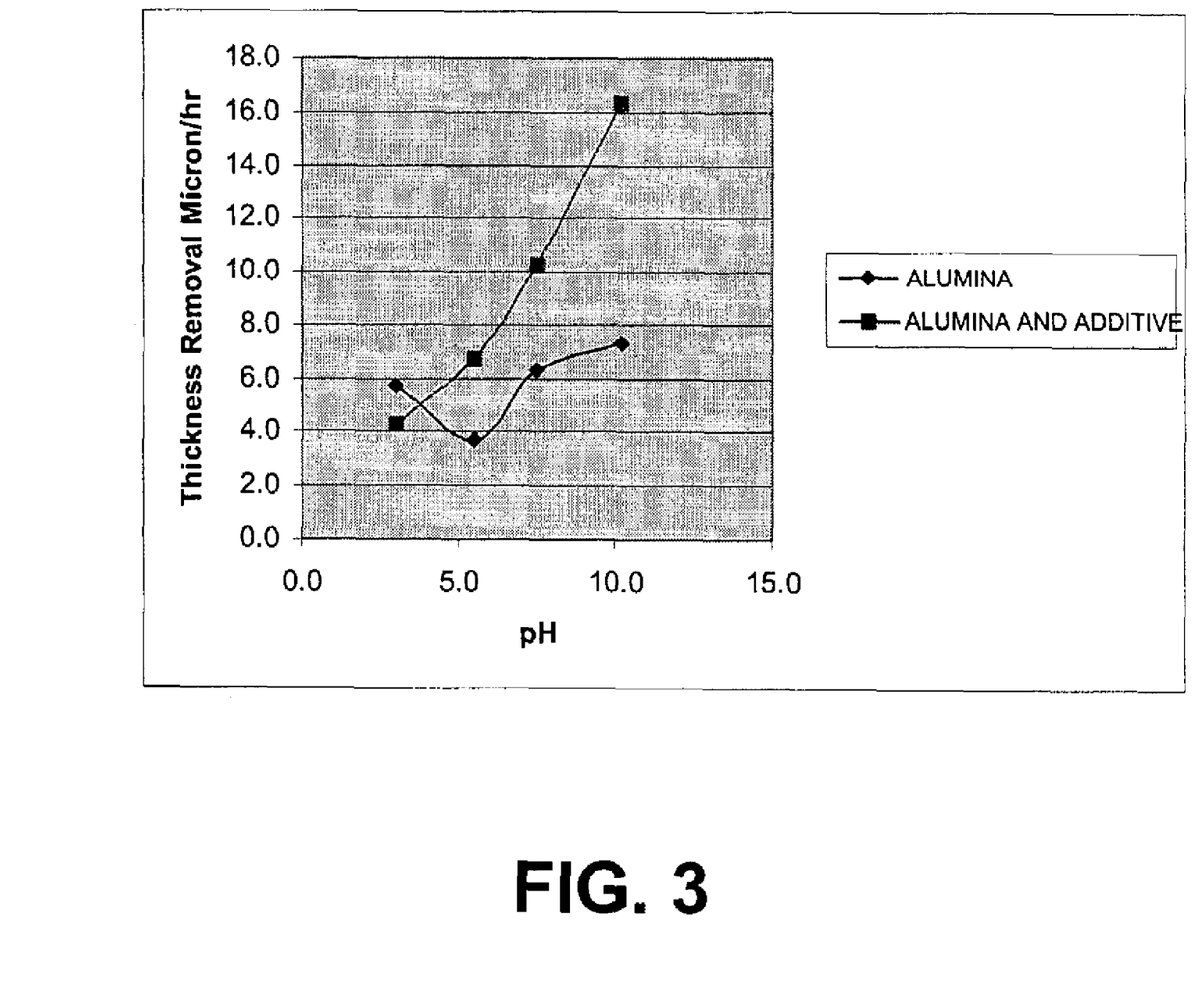
FIG. 3 illustrates the effect of pH on material removal rate according to various examples.

Slurries were prepared in essentially the same manner as in connection with Example 1, except that pH was varied by addition of KOH. In this regard, it was noted that the native pH by addition of the alumina particulate abrasive was 10.2, and that KOH was utilized to modify (reduce) the pH for testing. The results are shown below in Table 2 and FIG. 3.

TABLE 2

| | pH | | | |
|---|---|---|---|---|
| SLURRY | 3.0 | 5.5 | 7.5 | 10.2 |
| Alumina (μm/hr) | 5.7 | 3.7 | 6.3 | 7.3 |
| Alumina & Phosphate Additive (μm/hr) | 4.3 | 6.7 | 10 | 16.3 |

As illustrated, superior results were demonstrated as pH was increased. With respect to alumina/phosphate slurries according to embodiments of the present invention, preferably the pH is greater than about 8, such as greater than about 8.5.

EXAMPLE 3

Figure 4:
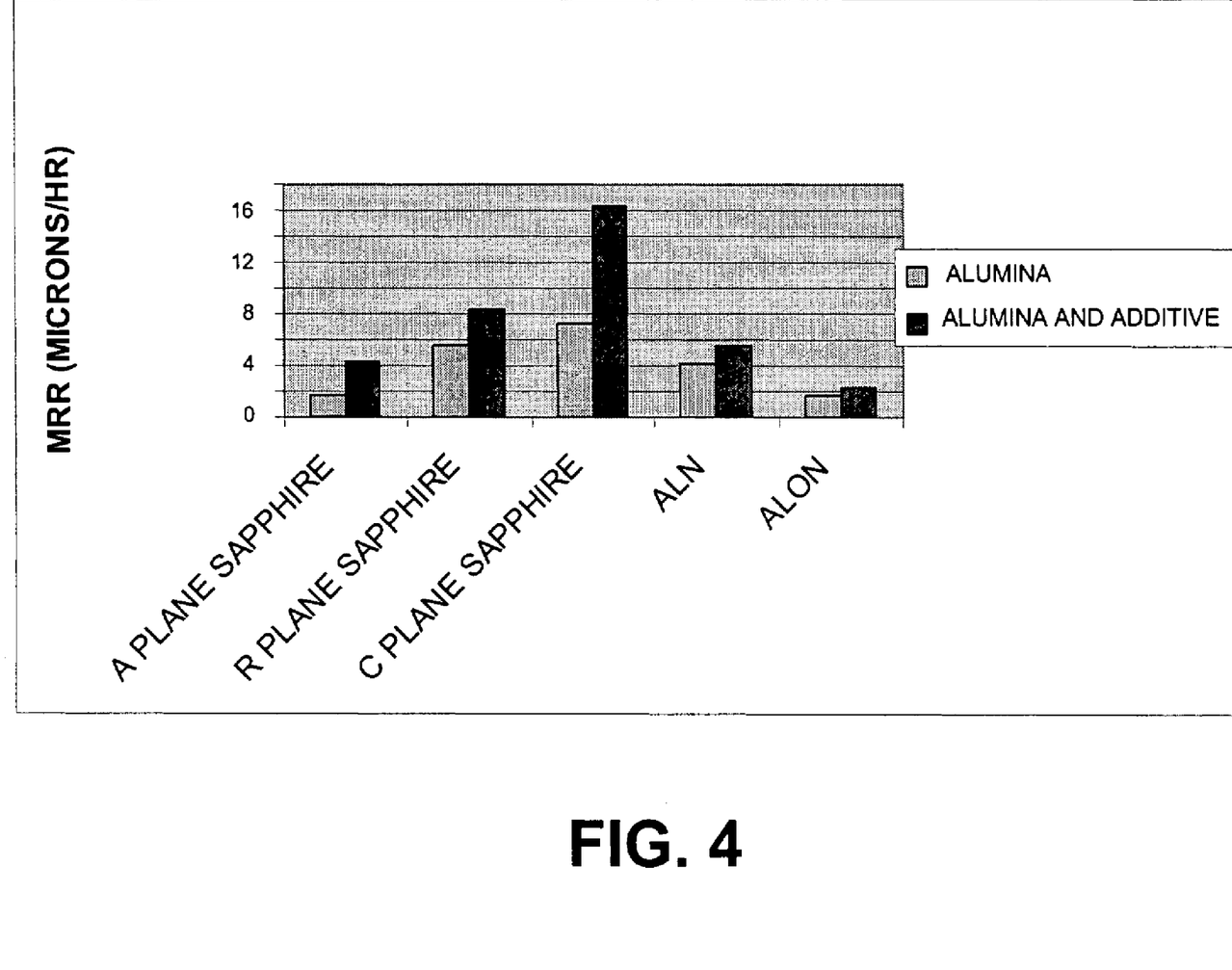
FIG. 4 illustrates the effect of a phosphate-based additive to an alumina slurry on material removal rate (MRR) according to various examples.

Next, slurries were prepared in the same manner as in Example 1, and utilized to polish various substrates, including a-plane, r-plane and c-plane sapphire, as well as aluminum nitride (AlN), and aluminum oxynitride (AlON). The results are shown below in Table 3 and FIG. 4. As illustrated, the use of the phosphorus additive was effective to improve polishing operations for all aluminum-containing ceramic materials tested.

TABLE 3

| | MRR Alumina | MRR Alumina + Additive | Ratio (MRR$_{add}$/MRR$_{con}$) |
|---|---|---|---|
| A PLANE SAPPHIRE | 1.70 | 4.30 | 2.53 |
| R PLANE SAPPHIRE | 5.50 | 8.30 | 1.51 |
| C PLANE SAPPHIRE | 7.30 | 16.30 | 2.23 |
| ALN | 4.20 | 5.60 | 1.33 |
| ALON | 1.70 | 2.33 | 1.32 |

EXAMPLE 4

Figure 5:
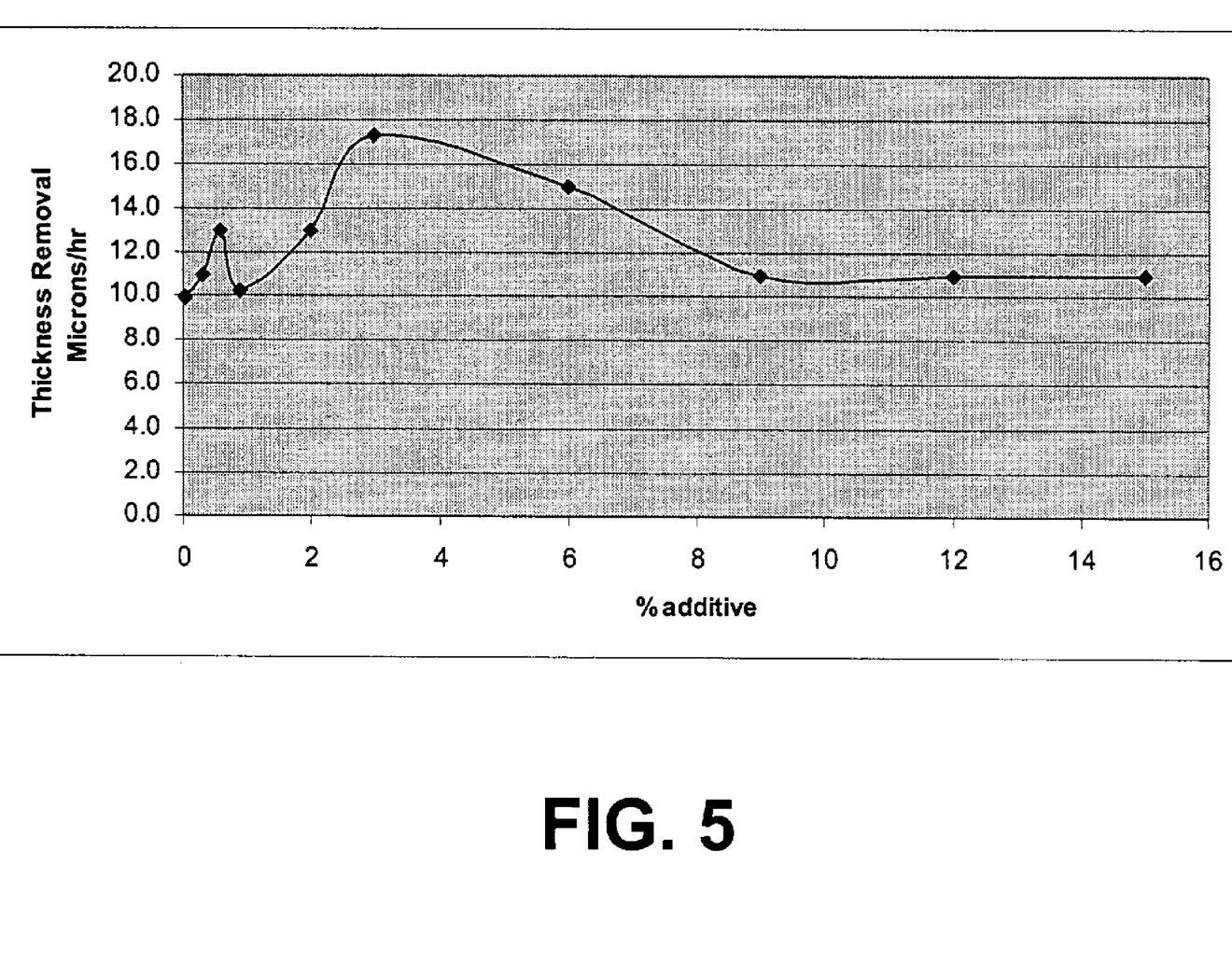
FIG. 5 illustrates the effect of concentration of a particular phosphate additive on material removal rate.

Next, slurries were prepared in the same manner as in Example 1, and the concentration of HPA was varied to investigate the effect of different levels of the phosphorus based additive. The different slurries were evaluated for material removal on c-plane sapphire. The results are shown below in FIG. 5 and Table 4. As above, MRR represents material removal rate in microns/hour. WRR represents weight removal in grams/hour. As illustrated, MRR increased from 0.03 wt % additive solution (0.003 wt % HPA additive) to 3.0 wt % of additive solution (0.3 wt % HPA additive), and slightly decreased at higher concentrations of HPA.

TABLE 4

| Additive solution wt % | MRR | WRR |
|---|---|---|
| 0.03 | 10.0 | 0.0681 |
| 0.3 | 11.0 | 0.0760 |
| 0.6 | 13.0 | 0.0855 |
| 0.9 | 10.3 | 0.0781 |
| 2.0 | 13.0 | 0.1004 |
| 3.0 | 17.3 | 0.1250 |
| 6.0 | 15.0 | 0.1115 |
| 9.0 | 11.0 | 0.0900 |
| 12.0 | 11.0 | 0.0962 |
| 15.0 | 11.0 | 0.0931 |

EXAMPLE 5

Multiple slurries containing different phosphorus compounds were prepared and tested on c-plane sapphire. The additive HPA was provided at a loading level of 3000 ppm (0.3 wt % HPA, 3.0 wt % of a 10% solution), as above. The results are shown below in Table 5, summarizing MRR in microns/hr.

TABLE 5

| TEST | C PLANE SAPPHIRE |
|---|---|
| ALUMINA ONLY | 7.3 |
| POTASSIUM PHOSPHATE | 13.5 |
| SHMP | 12.5 |
| Belcor 575 | 16.3 |
| MAYOQUEST 1320 | 17.3 |
| MAYOQUEST 1635 | 11.3 |
| MAYOQUEST 2100 | 12.0 |
| Dequest 2010 | 9.5 |
| TRIBASIC CALCIUM PHOS | 7.0 |
| ALUMINUM PHOSPHATE | 7.6 |
| PHOSPHOROUS ACID | 10.7 |
| SODIUM HYPOPHOSPHITE | 9.0 |
| RHODAFAC | 11.0 |

Belcor 575 is hydroxy phosphono acetic acid. Dequest 2010 ishydroxyethylidine diphosphonic acid. Mayoquest 1320 is aminotri-methylenephosphonic acid. Mayoquest 1635 is hexapotassium hexamethylenediaminetetra-(methylenephosphonic acid). Mayoquest 2100 is 2-phosphonobutane-1,2,4-tricarboxylic acid. SHMP is sodiumhexametaphosphate. Rhodafac BP-769 is a phosphate acid ester of ethoxylated phenol. The Belcor 575 (hydroxy phosphono acetic acid) and Mayoquest 1320 (aminotri methylenephosphonic acid) slurries show the best results, although many of the slurries demonstrated superior removal properties over alumina alone.

While the foregoing has focused on various embodiments, including embodiments based on alumina-based polishing slurries, other abrasive materials may be used as well with excellent results, including silica, zirconia, silicon carbide, boron carbide, diamond, and others. Indeed, the zirconia based slurries containing a phosphorus-based compound have demonstrated particularly good polishing characteristics, namely 30-50% improved material removal rates over silica alone on alumina substrates.

What is claimed is:

1. A method for machining a substrate, comprising:
providing a slurry between a surface of a substrate and a machine tool, the substrate consisting essentially of aluminum oxide, and the slurry comprising alumina abrasive and an additive comprising a phosphorus compound; and
moving the substrate relative to the machine tool to machine the surface of the substrate.

2. A method for machining a substrate, comprising:
providing a slurry between a surface of a substrate and a machine tool, the substrate consisting essentially of single crystal aluminum oxide, and the slurry comprising alumina abrasive and an additive comprising a phosphorus compound; and
moving the substrate relative to the machine tool to machine the surface of the substrate.

3. The method of claim 2, wherein the single crystal aluminum oxide is sapphire, selected from the group consisting of A-plane sapphire, R-plane sapphire, and C-plane sapphire.

4. The method of claim 3, wherein said sapphire is selected from the group consisting of A-plane sapphire and C-plane sapphire.

5. The method of claim 1, wherein the substrate is polished.

6. The method of claim 1, wherein the alumina abrasive has an median particle size within a range of about 0.05 microns to about 1.5 microns.

7. The method of claim 6, wherein said median particle size is within a range of about 0.10 to about 1.0 microns.

8. The method of claim 1, wherein the additive comprises an oxophosphorus compound.

9. The method of claim 8, wherein the phosphorus of the oxophosphorus compound is in a valency state of one, three, or five.

10. The method of claim 9, wherein the phosphorus is in a valency state of five.

11. The method of claim 8, wherein the additive is organophosphorus compound.

12. The method of claim 8, wherein the additive is selected from the group consisting of phosphates, pyrophosphates, hypophosphates, phosphonates, subphosphates, phosphites, pyrophosphites, hypophosphites, phosphinates, phosphonium compounds, and esters thereof.

13. The method of claim 12, wherein the additive is selected from the group consisting of potassium phosphate, sodium hexametaphosphate (SHMP), hydroxy phosphono acetic acid, aminotri-(methylenephosphonic acid), hexapotassiumhexarnethylenediaminetetra-(methylenephosphonic acid), 2-phosphonobutane-1,2,4-tricarboxylic acid, phosphate acid ester of ethoxylated phenol, hydroxyethylidinediphosphonic acid and phosphorous acid.

14. The method of claim 1, wherein the slurry is aqueous, having a pH not less than about 8.

15. The method of claim 14, wherein the slurry has a pH of not less than about 8.5.

16. The method of claim 1, wherein the machine tool comprises a polishing pad on a platen, and the substrate is machined by contacting the machine tool with the substrate, and moving the substrate relative to the platen, wherein the platen is rotated relative to the substrate at a velocity of not less than 2.0 m/s.

17. The method of claim 16, wherein the platen is rotated relative to the substrate at a velocity of not less than 2.5 m/s.

18. The method of claim 1, wherein the phosphorus compound is provided in the slurry at a concentration within a range of about 0.05 to about 5.0 wt %.

19. A method for machining a substrate, comprising:
providing a slurry between a surface of a substrate and a machine tool, the substrate consisting essentially of aluminum oxide, and the slurry comprising abrasive and an additive comprising a phosphorus compound; and moving the substrate relative to the machine tool to machine the surface of the substrate.

* * * * *

UNITED STATES PATENT AND TRADEMARK OFFICE
CERTIFICATE OF CORRECTION

PATENT NO. : 7,306,748 B2
APPLICATION NO. : 10/423283
DATED : December 11, 2007
INVENTOR(S) : Ronald W. Laconto et al.

It is certified that error appears in the above-identified patent and that said Letters Patent is hereby corrected as shown below:

Column 8, claim 13, line 5, please delete
"hexapotassiumhexarnethylenediaminetetra-(methylenephosphonic acid),"
and insert therefore
--hexapotassiumhexamethylenediaminetetra-(methylenephosphonic acid)--.

Signed and Sealed this

Fifteenth Day of July, 2008

JON W. DUDAS
*Director of the United States Patent and Trademark Office*